(12) United States Patent
Bell et al.

(10) Patent No.: US 6,880,005 B1
(45) Date of Patent: Apr. 12, 2005

(54) MANAGING POLICY RULES IN A NETWORK

(75) Inventors: Carol A. Bell, Beaverton, OR (US); Michael D. Shipley, Ft. Collins, CO (US); Scott D. Hahn, Beaverton, OR (US)

(73) Assignees: Intel Corporation, Santa Clara, CA (US); Hewlett-Packard Company, Fort Collins, CO (US)

(*) Notice: Subject to any disclaimer, the term of this patent is extended or adjusted under 35 U.S.C. 154(b) by 0 days.

(21) Appl. No.: 09/539,927

(22) Filed: Mar. 31, 2000

(51) Int. Cl.[7] ............................................. G06F 15/16
(52) U.S. Cl. ...................... 709/225; 223/224; 223/229; 713/201
(58) Field of Search ............................... 709/224, 225, 709/223, 229; 713/201, 154, 153

(56) References Cited

U.S. PATENT DOCUMENTS

| | | | | |
|---|---|---|---|---|
| 5,278,901 A | * | 1/1994 | Shieh et al. ................ 713/200 |
| 5,694,590 A | * | 12/1997 | Thuraisingham et al. ...... 707/9 |
| 5,797,128 A | * | 8/1998 | Birnbaum ...................... 707/5 |
| 5,978,476 A | * | 11/1999 | Redman et al. ............... 705/51 |
| 5,999,978 A | * | 12/1999 | Angal et al. ................. 709/229 |
| 6,061,682 A | * | 5/2000 | Agrawal et al. ............... 707/6 |
| 6,105,027 A | | 8/2000 | Schneider et al. |
| 6,158,010 A | * | 12/2000 | Moriconi et al. ........... 713/201 |
| 6,167,445 A | * | 12/2000 | Gai et al. ................... 709/223 |
| 6,182,142 B1 | * | 1/2001 | Win et al. ................... 709/229 |
| 6,202,157 B1 | * | 3/2001 | Brownlie et al. ........... 713/201 |
| 6,219,786 B1 | * | 4/2001 | Cunningham et al. ...... 713/152 |
| 6,237,036 B1 | * | 5/2001 | Ueno et al. ................. 709/225 |
| 6,327,618 B1 | * | 12/2001 | Ahlstrom et al. ........... 709/223 |
| 6,347,330 B1 | * | 2/2002 | Dawson et al. ............. 709/203 |
| 6,366,913 B1 | * | 4/2002 | Fitler et al. ..................... 707/9 |
| 6,408,336 B1 | * | 6/2002 | Schneider et al. .......... 709/229 |
| 6,418,467 B1 | * | 7/2002 | Schweitzer et al. ......... 709/223 |
| 6,453,419 B1 | * | 9/2002 | Flint et al. .................. 713/201 |
| 6,460,141 B1 | * | 10/2002 | Olden ......................... 713/201 |
| 6,473,763 B1 | * | 10/2002 | Corl et al. ................... 707/101 |
| 6,484,261 B1 | * | 11/2002 | Wiegel ....................... 713/201 |
| 6,574,737 B1 | * | 6/2003 | Kingsford et al. .......... 713/201 |

* cited by examiner

*Primary Examiner*—William C. Vaughn, Jr.
(74) *Attorney, Agent, or Firm*—Fish & Richardson P.C.

(57) ABSTRACT

Policy rules are disseminated on a network and are received by one or more devices on the network. Each device is configured with a proxy agent that translates the policy data into a format that is meaningful to the device. The agent translates the policy rules into an access list that generates permit and deny filters that determine the access that the device is allowed on the network.

18 Claims, 5 Drawing Sheets

MANAGING POLICY RULES IN A NETWORK

This invention relates to managing policy rules in a network.

BACKGROUND

Increased use of networks such as local area networks (LAN) and wide area networks (WAN) creates network traffic from sources such as application software, network applications, network operating systems (NOS) and distributed database programs that generate various "housekeeping" messages. Policy Based Network Management (PBM) environments offer one solution to managing this increasing network traffic. PBM environments involve the establishment of priorities for network traffic based on parameters such as traffic-type, application and user identification. Many network transmission technologies such as Asynchronous Transfer Mode (ATM) have great success with this type of traffic management as a result of increasing Quality of Service (QoS) levels. Servers on the PBM network send out the policy rules to a number of devices present on the network. The devices receive policy rules and translate the rules to a format that is meaningful to the device.

DETAILED DESCRIPTION

Figure 1:
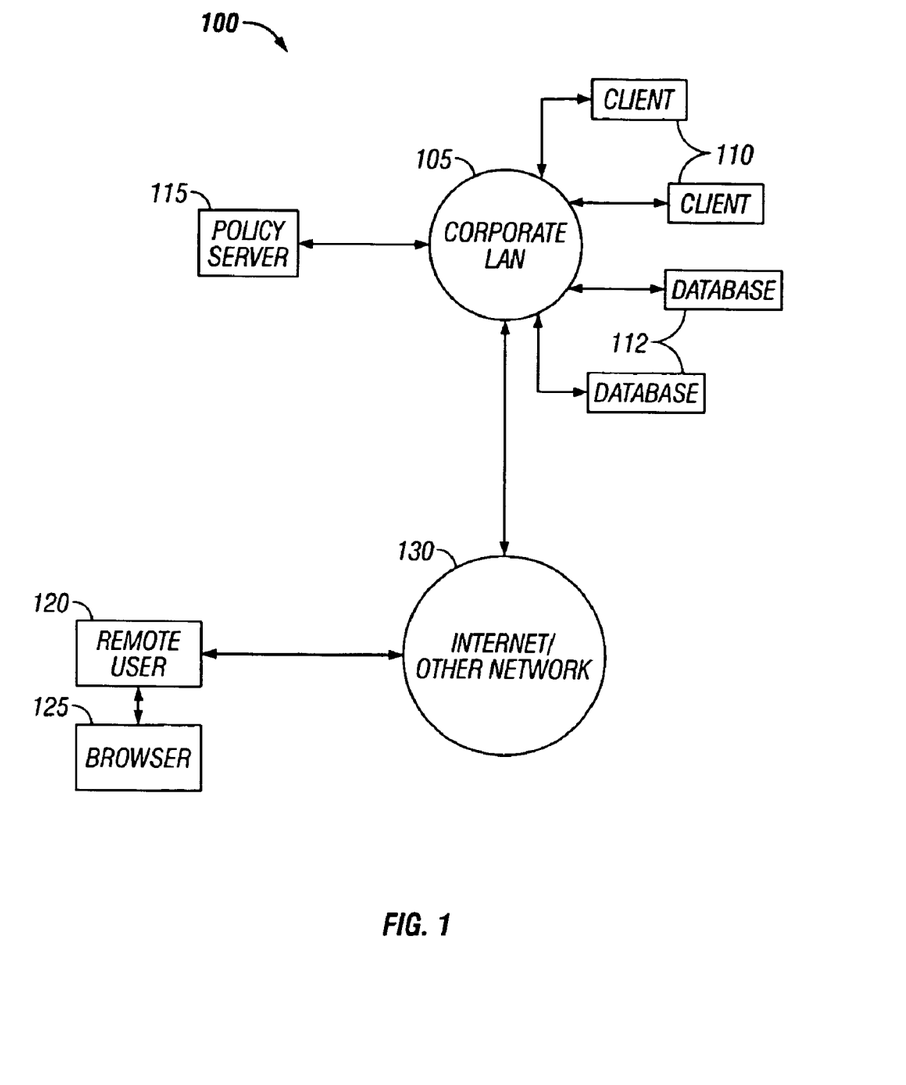
FIG. 1 illustrates an exemplary transaction system.

As shown in FIG. 1, a transaction system 100 facilitates transactions between a corporate local area network (LAN) 105 and one or more devices attached to the corporate LAN 105. One or more clients 110 can be attached to the LAN locally for access to corporate databases 112 or other devices (not shown). The LAN 105 can also serve as a gateway to the Internet or other network 130. A remote user 120 can access the corporate LAN either directly (not shown) or through the Internet/network 130. The remote user 120 may have a browser 125 attached to it. The LAN 105 may have one or more servers connected to it to handle data and transactions on the LAN 105. For example, a policy server 115 is a shared computer on the corporate LAN 105 that handles data and transactions that relate to policies, policy delivery and policy enforcement on the LAN 105 and occur between the clients 110 and databases 112 or other devices.

Figure 2:
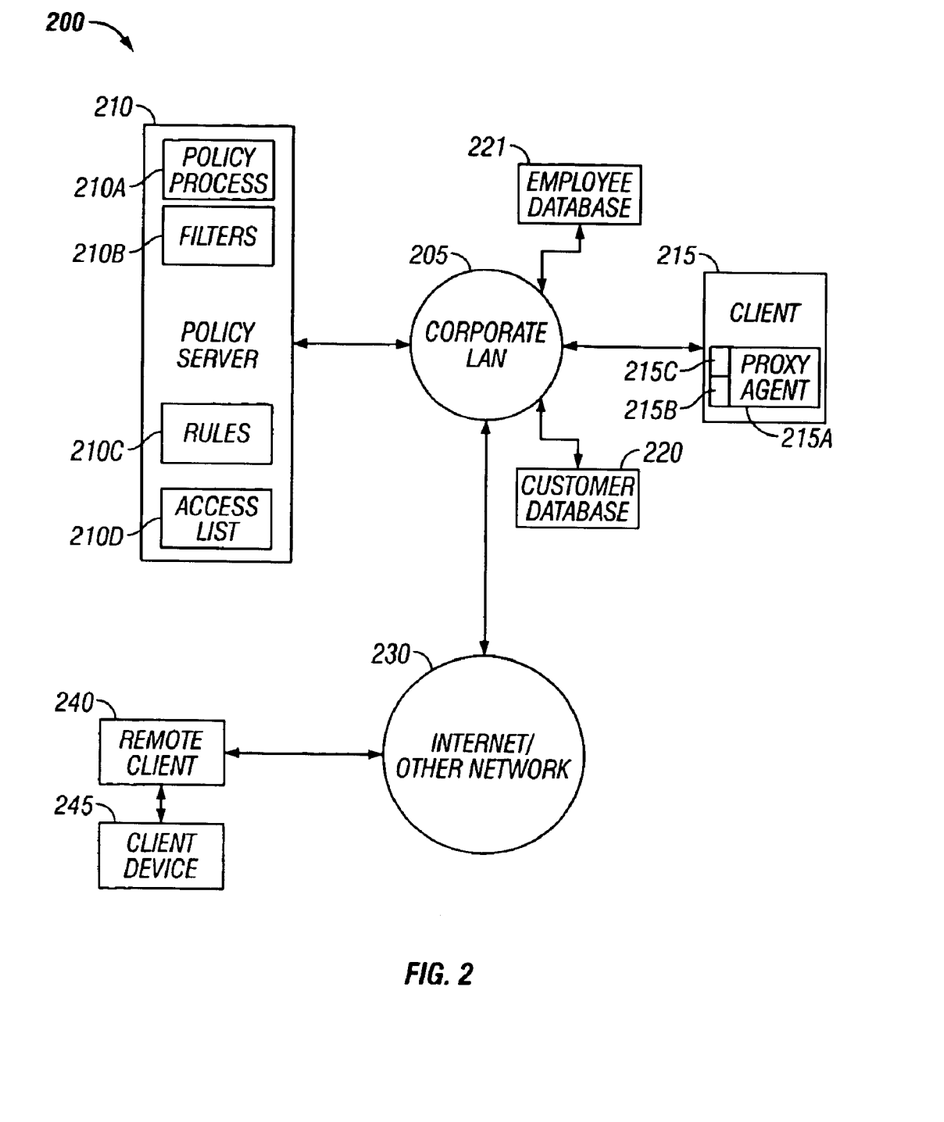
FIG. 2 illustrates a policy server and devices on a local area network.

FIG. 2 illustrates an expanded view of the transaction system 100 in FIG. 1. A policy server 210 and attached devices 215, 220, 221 are connected on a corporate LAN 205. Several software applications and processes reside on the policy server 210. One process that resides on the policy server 210 is a policy-implementation and enforcement (PIE) process 210a. Associated with the PIE process 210a are multiple data structures in the form of filters 210b that allow access between devices attached to the LAN 205, such as the client 215 and devices that can access the LAN 205 externally, such as a remote client 240. The filters 210b can be programmed either to permit or deny one device from accessing another device. For example, the remote client 240, which may be a small office home office (SOHO) may want to initiate a virtual private network (VPN) session with the LAN 205. A VPN gateway, which in this case is client 240, to the LAN 205 can be programmed, for example, with a policy from the server 210 to allow the remote client 240 only to arrange access of a client device 245 directly into the LAN 205, but not to allow a connection by the client device 245 to the Internet 230. As another example, the client 215 may be a computer belonging to a company salesman. The policies on the LAN 205 would create a filter 210b that would allow the client 215 to access a customer database 220, but not to access an employee database 221 that contains employees' records.

Each device on the LAN 205, such as the client 215, has a proxy agent 215a residing on it. The proxy agent 215a receives policy rules from the policy server 210. The policy rules contain data structures for an access control list 210d and filters 210c to configure the client 215. The client 215 uses the access control list and filters to determine which other devices or databases 220, 221 that it is permitted to access. The filters generated from multiple rules can be added to one list or be placed on several different lists. The proxy agent 215a receives the policies in units called "policy groups" 215c, each of which is targeted to several locations on the device. For example, one policy group 215c can determine which databases 220, 221 the client 215 can access. Another policy group 215c can determine what access the client 215 can have to networks outside the corporate LAN 205 such as Internet 230. The policy groups 215c specifically contain the data structures for access lists 210d and filters 210c.

In another embodiment, the proxy agent 215a, manages one or more devices on the corporate LAN 205 that provide networks services such as routing, switching and packet shaping.

A policy group 215c can be implemented as a tree structure that includes several layers.

Figure 3:
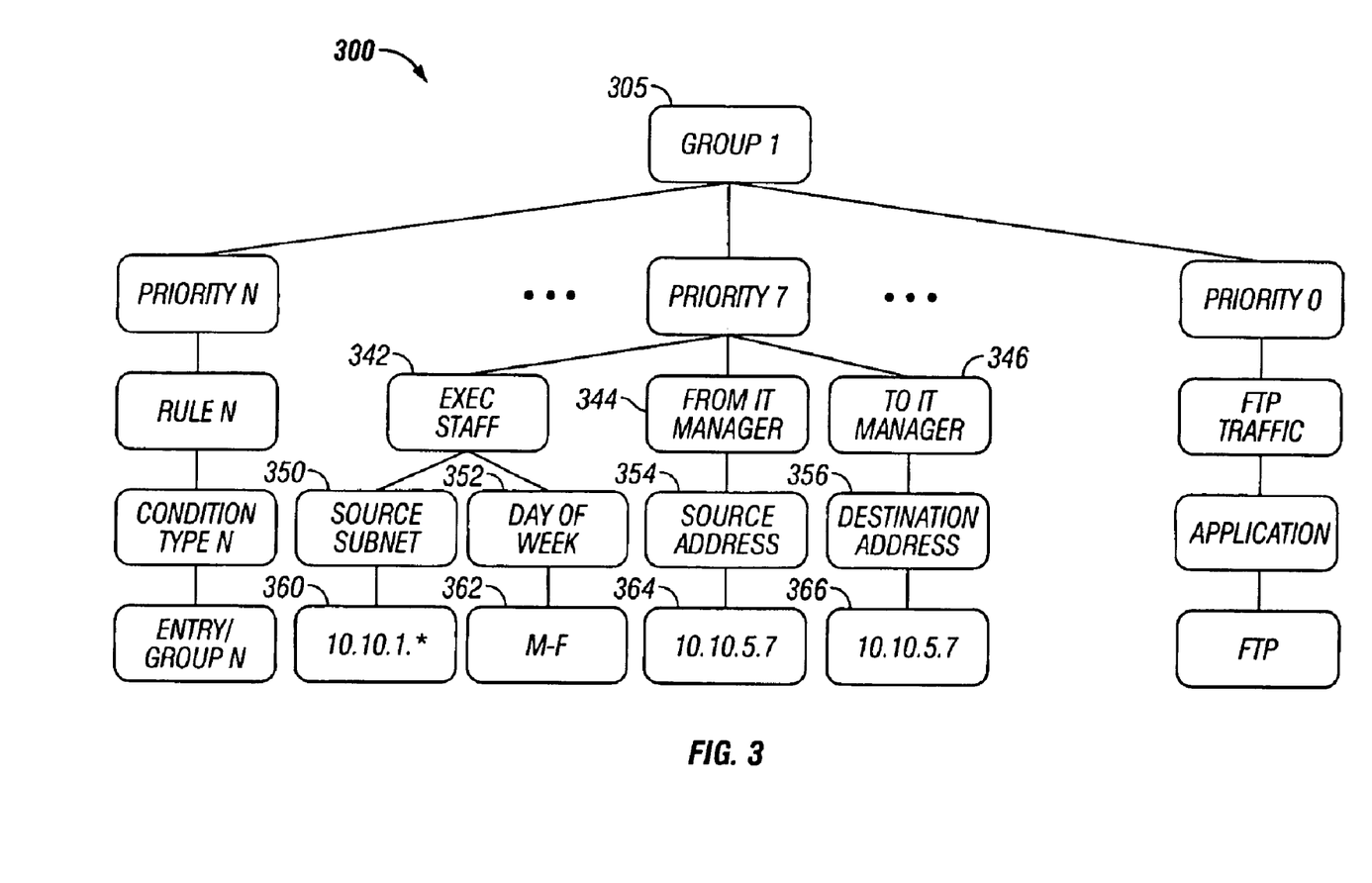
FIG. 3 illustrates an implementation of a policy tree.

FIG. 3 illustrates an exemplary policy tree 300. There may be several policy groups in the network system 100 (FIG. 1). The policy tree 300 typically represents one policy group 305. The policy tree 300 typically includes several layers including, but not limited to, instance, rule, condition type and entry group layers. In other implementations, policy trees can have additional or different layers. The instance layer defines the policy instances, such as the priorities that are provided by the policy server 210. A policy instance includes an action and a list of policy rules. If any of the rules evaluate to TRUE, then the action is applied on the network. If none of the rules are TRUE then the action is not applied. The rule layer defines the policy rules provided by the policy server 210. A policy rule is a list of conditions, each of which contains a set of values. A condition is TRUE if it matches one or more of the values in the set. A policy rule is TRUE if all of the conditions are TRUE. Therefore the conditions have an "OR" relationship and the rules have an "AND" relationship. Policy instances, rules and conditions are discussed in detail below with respect to condition and rule simplification.

As illustrated by the policy tree 300, each policy instance (such as priority 7) can be expanded into several policy rules. From the proxy agent's 215a perspective, each policy instance or each policy rule represents a set of conditions that must be translated into an access list. Each rule is translated into a set of filters, and the filters generated from multiple rules can be added to the same list or can be placed on separate lists.

As shown in FIG. 3, the policy group 305 includes an instance defining "Priority n", with a corresponding "Rule n", "Condition Type n" associated with "Rule n" and an "Entry/Value n" that defines the details of "Rule n". For example, "Priority 0" may correspond to an instance of the policy group that allows access to specific company files. "Rule 0" may then correspond to specific persons in the company that are permitted that access, in this case the regular file transfer protocol (FTP) traffic on the corporate LAN 205. "Condition Type 0" corresponds to the conditions 35 that have to be met in order for the FTP to have access to the files, in this case simply the software applications available on the corporate LAN 205. "Entry/Value 0" corresponds to the specific details of the conditions that allow access, in this case the FTP address of the application 320.

The policy tree also can be more complex. For example, "Priority 7" may correspond to a more restricted policy instance in the policy group 305. This instance defines a rule 342 that corresponds to the executive staff and may define access to more sensitive company files such as employee records or proprietary information associated with an initial public offering, for example. One condition 350 defines the source subnet where the information is stored. The entry/group 360 gives the specific address IP 10.10.1.*360. Another condition 352 is that the staff can access the information only during specified days of the week. The entry/group 362 defines those days to be Monday through Friday. Other rules 344, 346 under "Policy 7" relate to traffic to and from the information technology (IT) manager 344, 346. The source address 354 and the destination address 356 are conditions associated with the rules 344 and 346 respectively. In this example, the source and destination address entry/group designations 364, 366 are identical 10.10.5.7.

The policy tree 300 is illustrative and does not limit the number of policy tree structures that can be used in other implementations.

Figure 4:
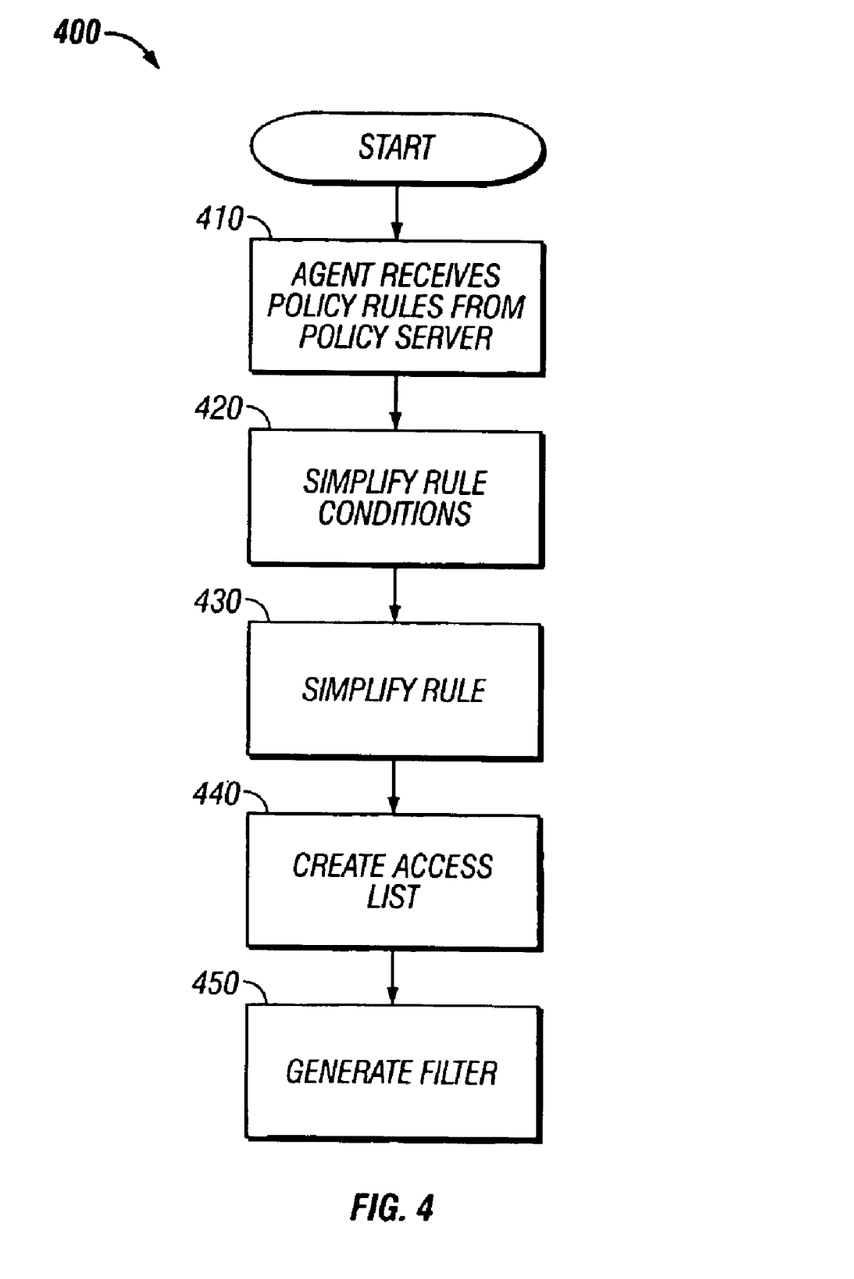
FIG. 4 illustrates a flow chart for an exemplary proxy agent process.

FIG. 4 illustrates a flow chart of an implementation of a proxy agent process 400 in which policy rules are translated into access lists. The proxy agent 215a residing on the client device 215 first receives 410 the policy rule. If there are any conditions associated with the rule, the conditions are simplified 420. The rule itself is then simplified 430 (as discussed further below). Once the rules and conditions are simplified then access lists are created 440. The access lists are then used to generate the filters 450.

Condition and Rule Simplification

As discussed above, policy rules are received as a policy group 305 in the form of a policy tree 300 that determines how the rules will be translated into policy data that the client device 215 can interpret and implement. When the proxy agent 215a receives policy rules from the policy server 210, the policy group 305 typically is in a format that the client device 215 cannot interpret. The proxy agent 215a therefore translates the policy group 305 into specific data (policy values) that the device can interpret. A proxy agent 10 preprocessor 215b (FIG. 2) handles the translation of the policy rules into policy values using the policy tree 300.

Figure 5:
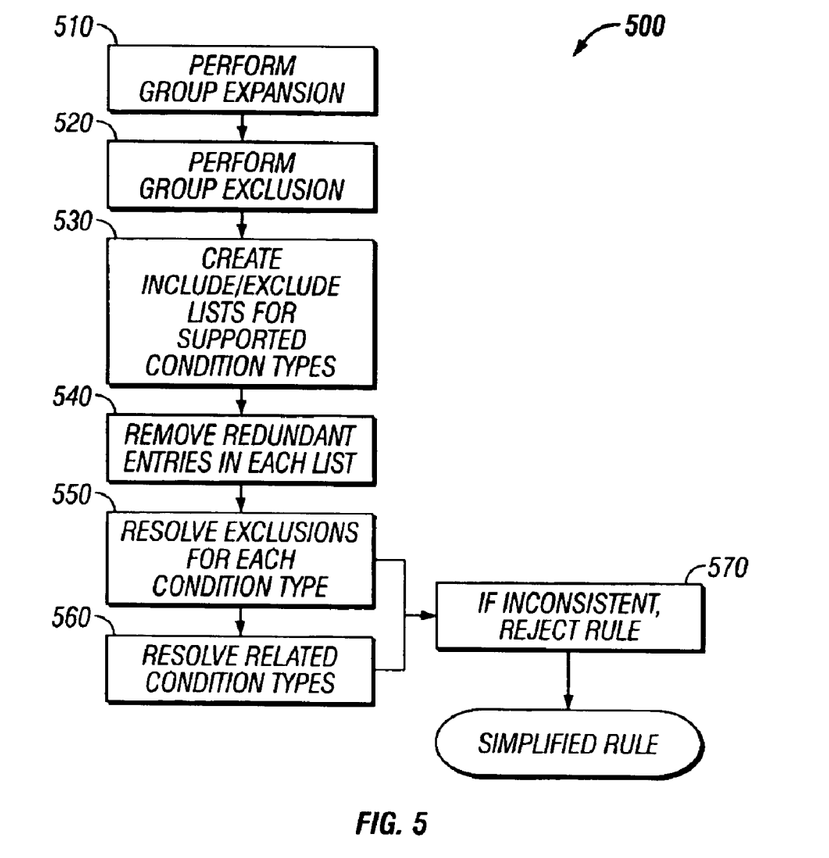
FIG. 5 illustrates a flow chart for an exemplary translation process.

FIG. 5 illustrates a flowchart of a translation process corresponding to the rule simplification (430 in FIG. 4). The translation includes an expansion 510 of the group 305 into the several conditions. This group expansion results in a large set of policy values that are useable by the client device 215.

There may be several identical policy values in a policy group 305. For example, as shown in FIG. 3, the policy values 364 and 366 corresponding to the condition type's "source address" 354 and "destination address" 356 respectively, are identical. The proxy agent 215a is programmed to handle possibilities of policy value duplication in order to deliver the correct policy values to the corresponding destinations on the client device 215.

Referring again to FIG. 5, in addition to group expansion 510, group exclusion 520 also is performed. For each policy instance in a policy group 305, there exists an action X with an associated set of rules that can be represented as:

$$r_k = \{r_1, r_2 \ldots r_n\}.$$

The action X is performed if any one or more of the rules $r_k$ is true. An individual condition is true if the condition equals one of the policy values in the list of entries. Therefore, "OR" logic is applied at the rule level; that is, if $r_1$ OR $r_2$ OR $r_n$ is true, perform X. However, "AND" logic is applied at the condition level; in other words, all conditions associated with a rule must be met in order for X to be performed. For the set of rules $r_k$ discussed above, there may be the following associated conditions:

$$r_1 \sim c_1, c_2$$

and $$r_2 \sim c_3, c_4.$$

Therefore, assuming that the rules $r_1$ and $r_2$ are the only rules in $r_k$, either $r_1$ or $r_2$ must be true for X to be performed. If $r_1$ is true, then using the "AND" logic, both $c_1$ and $c_2$ must be true for X to be performed. Similarly, if $r_2$ is true then $c_3$ and $c_4$ must be true. Finally, "OR" logic is applied at the policy entry/value level.

Referring back to FIG. 3, for example, the policy instance for Priority 0 can be expressed as "give Priority 0 to a packet if its application type is FTP". The policy instance for Priority 7 can be expressed as "give Priority 7 to a packet if it has a source subnet of 10.10.1.* AND is sent on Monday through Friday , OR if it is sent from address 10.10.5.7, OR if it is sent to address 10.10.5.7.

More specifically, a policy instance can be expressed as follows: IF ($r_1$) OR ($r_2$) . . . OR ($r_k$) THEN perform {X}. Similarly, a policy rule can be expressed as follows: IF ($c_1$={A OR B OR . . . N}) AND ($c_2$={C OR D OR . . . M}) AND . . . ($c_k$={X OR Y OR . . . Z}) THEN (Rule=TRUE).

Similarly, any condition in a rule may use negative logic. The effect of using negative logic is to exclude values for the condition. For example, the system could compose a rule that states, "give Priority 0 to a packet if its application type is FTP AND its destination address is NOT 10.10.5.7". In this case, the condition type for the destination address would have an "exclude" flag set to indicate that negative logic is to be used for that condition. Other logic conditions can be used in other embodiments.

The use of exclusion also can be used for assigning an action to all members of a particular group. For example, a rule can read, "give Priority 2 to a packet if the packet's source address is in Group A and if its source address is not X, where X is a member of Group A." In this example, the proxy agent preprocessor 215b interprets the rule as containing two condition type lists for the same condition, one with the exclude flag set and one without the exclude flag set. The same entry value may appear on both lists without the use of groups. The system 100 also can compose polices that include and exclude values for the same condition type.

Some of the condition types that are used to create policies for access lists are interrelated. For example, a condition type might be the sub-network from which the packet originated. A related condition type may be the address from which the packet originated. Another condition type that can be used for access type policies is the application associated with the packet, identified by either the packet's source or destination port. Related to this condition type are the individual condition types that specify the source port or the destination port. There is the potential that related condition types might conflict with each other, because the user can compose rules that specify all of these condition types.

Rule simplification reduces a policy group into a rule that preferably contains no irrelevant or redundant information. In some cases, the simplified rule will be the same as the original rule. In other cases, the simplified rule is different from the original rule, if, during the translation process, unnecessary information was removed from the rule as a result of using groups exclusion and related condition types.

Referring again to FIG. 5, after group exclusion 520 is performed, the entry values are extracted for each condition type and an access list is built 530 into a set of arrays. There are two arrays for each condition type, one for the "included" values specified for the condition and another array for the "excluded" values specified for the condition. In some cases, the excluded values for a condition type may be merged with the excluded values of related condition types, by eliminating the "excluded" array for that type. In one embodiment, the arrays are vectors of values appropriate for the condition type. Redundant or duplicate information is removed 540 from each list. For some condition types, one entry value may imply another, so that only the second entry value needs to be present on the access list. A reconciliation of the lists of included and excluded entries for the same condition type is performed 550. For example, intended entries that appear on both the excluded list and the included list for the same condition type are removed from the included list. The entries in the lists of related condition types are compared and it is determined which entries in the affected lists are consistent with one another. Related condition types are then resolved 560. Irrelevant entries are removed from the lists 570. Irrelevant data is a condition value that does not contribute to the rules and therefore does not need to be accounted in the resulting access list. For example, the rule IF IP_Address={A OR B} AND IP_Address NOT {C} does not need the excluded condition IP_Address NOT C. Therefore, the latter condition can be ignored. Similarly, redundant data can arise if groups containing overlapping values are used to create rules. For example, if Group 1 contains (A, B, and C) and Group 2 contains (C, D, and E), then a policy rule that says IF IP_Address={Group 1 OR Group 2}, this would expand to (A, B, C, C, D, E). In that case, removing the redundant data simply means removing the additional C.

If a rule that results from 550 and a rule that results from 560 are inconsistent, then the preprocessor 215b rejects the rule 570 because it is impossible to satisfy. For example, if all the entries on the included list are also on the excluded list, then the rule is impossible to satisfy and it is rejected.

Access List Creation and Filter Generation

The include and exclude arrays that result from the simplified rule discussed above yield an "access list" (in other words, the set of arrays) (440 FIG. 4). At the end of the rule simplification process, the access list is used to generate access list filters. The arrays that emerge from the process may represent the same condition types (either included or excluded) as those in the original rule. However, the rule simplification process may create "paired" conditions if it is convenient for the particular condition types. For example, a condition type may represent a pair of port numbers, one for source and one for destination. If this type of pairing is performed, it serves as a preliminary step to building the actual filters.

Figure 6:
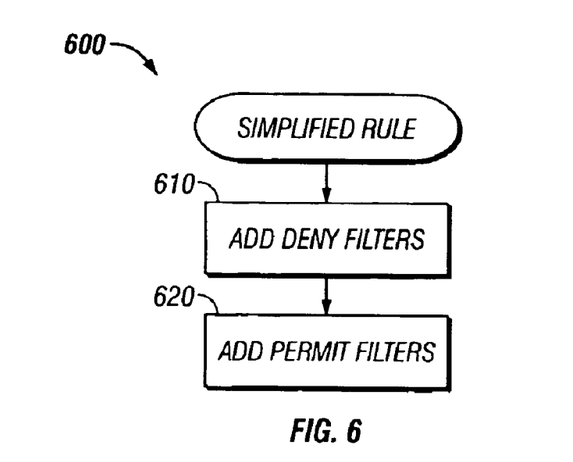
FIG. 6 illustrates a flow chart of an implementation of access list filter generation.

FIG. 6 illustrates an implementation of a flow chart for an access list filter generation process 600. The simplified rule is used to add 610 deny filters and to add 620 permit filters. To add a deny filter 610, one filter is created for each entry in the non-empty exclude array by combining the entry with an entry in each of the include arrays for the other condition types. If any of the other conditions types has an empty include array, then for this purpose that array is considered to be an array containing a single entry that is set to "any value". The number of deny filters created for each exclude entry is the number of distinct combinations that can be created from the entries in the include arrays for he other condition types.

To add a permit filter 620, one entry is selected from each non-empty include array and these entry values are combined to form a single permit filter. If any of the condition types has an empty include array, then for this purpose the array is considered to be an array containing a single entry that is set to "any value". The number of permit filters created is the number of distinct combinations that can be created from the entries in the include arrays.

Condition values associated with a packet are matched to the filters in the order the filters appear on the access list. If the packet's values do not match any filter on the list, the default action is to disallow the packet, and access is therefore denied.

In one implementation, filter generation uses the arrays generated from the redundancy checks along with a set of indices, one index for each included and excluded array. The index represents an individual value within the array. To generate an individual filter, each index is set to a particular value and the filter is created from the array values at those indices. An index value of "−1" indicates that the value is unspecified for that particular condition.

As an example, it is assumed that there are six conditions that contribute to a filter: $c_1, c_2, c_3, c_4, c_5, c_6$, where the conditions are:

$c_1$=Source IP Address and Mask
$c_2$=Destination IP Address and Mask
$c_3$=Source Port and Protocol
$c_4$=Destination Port and Protocol
$c_5$=IP Protocol
$c_6$=IP Precedence.

Each condition has deny and permit indices, $d_1, d_2, d_3, d_4, d_5, d_6$ and $p_1, p_2, p_3, p_4, p_5, p_6$, respectively, for the exclude and include arrays $E=(E_1[d_1], E_2[d_2], E_3[d_3], E_4[d_4], E_5[d_6])$ and $I=(I_1[p_1], I_2[p_2], I_3[p_3], I_4[p_4], I_5[p_5], I_6[p_6])$. The conditions and arrays can be generalized to N conditions and N arrays. Typically the deny filter is created first. A deny filter is created by first determining which exclude arrays are non-empty (after exclusion and redundancy checks have been performed), and combining the elements of these arrays with the elements of the non-empty include arrays for the other conditions types. If, for a given excluded condition, all the other condition types have empty include arrays, then for each entry in the exclude array, a single deny filter is generated that specifies only the value for the excluded condition. As stated above, to create deny filters, each exclude array entry is combined with each include array entry and repeated until all filters are created. Six include arrays and one exclude array may look like the following:

$I_1$={1.2.0.0/255.255.0.0, 3.4.10.0/255.255.0.0}
$I_2$={9.8.7.6}
$I_3$={100/TCP, 500/UDP}
$I_4$={600/TCP, 500/UDP}
$I_5$={ }
$I_6$={1}
$E_1$={1.2.10.0/255.255.255.0, 3.4.10.0/255.255.255.0}

After combining the arrays as described above and removing irrelevant and redundant data, a typical deny filter may then look like:

$E_1[d_1]$=1.2.10.0/255.255.255.0
$I_2[d_2]$=9.8.7.6
$I_3[d_3]$=100/TCP
$I_4[d_4]$=600/TCP
$I_5[d_5]$=Unspecified
$I_6[d_6]$=1

Permit filters are created by combining each include array element with the include array elements of all the include arrays. After combining the elements in the arrays and removing the irrelevant and redundant data, a typical permit filter may then look like:

$I_1[p_1]$=1.2.0.0/255.255.0.0
$I_2[p_2]$=9.8.7.6
$I_3[p_3]$=100/TCP
$I_4[p_4]$=600/TCP
$I_5[p_5]$=Unspecified
$I_6[p_6]$=1

Additional filters that are created from the specified conditions, $c_1,c_2,c_3,c_4,c_5,c_6$. The deny and permit filters discussed above are only illustrative of the types of filters that can be generated in this example. Other combinations as well as other condition types can be generated.

In another implementation an alternate form of translation can generate deny conditions. This alternate form of the translated access list can be used for any device that can handle multiple access lists for a policy type. For example, if a device can evaluate more than one access list to determine the priority to which a particular packet should be assigned, then the translation can be optimized. Each policy rule is placed into a separate access list. For the filter generation, each entry in the non-empty exclude array generates a deny filter that specifies only the denied value, with all other condition types unspecified. Permit filters are handled in a similar way. When handling a packet, the first access list is consulted, and each filter is checked against the packet values. If the packet matches a permit filter, the action associated with the policy is taken and no further filters or access lists are checked. If the packet matches a deny filter, then no more filters in the current access list are checked and the device proceeds to the next access list and begins checking the packet against those filters. If the packet does not match any filters in the access list the device proceeds to the next access list and begins checking the packet against those filters.

The systems and techniques described here can enable a number of devices on a network to be managed effectively with one uniform set of policy rules and enable the devices to uniquely translate the policy rules to a format that is meaningful to each device.

Various aspects of the proxy agent 215a may be implemented in digital circuitry, or in computer hardware, firmware, software, or in combinations of them. Apparatus of the invention may be implemented in computer products embodied in a machine-readable storage device for execution by a programmable processor. The foregoing techniques may be performed, for example, by a programmable processor executing a program of instructions to perform functions of the invention by operating on input data and generating output. The techniques may be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially-designed application-specific integrated circuits (ASICS).

Other implementations are within the scope of the following claims.

What is claimed is:

1. A machine-implemented method, comprising:
   obtaining policy rules, and simplifying said policy rules to form simplified policy rules, wherein a policy rule comprises one or more conditions and one or more values associated with the one or more conditions, the one or more conditions to be evaluated for network communications based on the one or more values, and said simplifying comprises eliminating at least one of any redundant conditions and values from the policy rule based at least in part on condition-type information of the one or more conditions; and
   based on said simplified policy rules, creating an access control list adapted to configure a network device, including creating at least one array of included conditions and at least one array of excluded conditions from the policy rules; and
   using the access control list to generate access filters that configure the network device to control network communications in the network device, including generating, after redundancy checks, one or more deny filters by combining the at least one array of excluded conditions and the at least one array of included conditions, and wherein generating the access filters comprises adding one or more filters adapted to control access of a device to a component other than the network device in a network connected to the network device.

2. The method of claim 1 further comprising expanding the policy rules into value groups that represent conditions occurring in the network device associated with the policy rules.

3. The method of claim 2 wherein said simplifying comprises excluding conditions that would otherwise be implied by policy rules.

4. The method of claim 3 further comprising resolving inconsistent conditions that result from expanding the policy rules and excluding the policy rule conditions.

5. The method of claim 1 further comprising generating permit filters by combining the at least one of the arrays of the included conditions with the remaining arrays of included conditions.

6. A system comprising:
a first device adapted to disseminate policy rules in a network; and
a second device adapted to receive the policy rules disseminated on the network by the first device and adapted to perform operations comprising:
simplifying said policy rules to form simplified policy rules, wherein a policy rule comprises one or more conditions and one or more values associated with the one or more conditions, the one or more conditions to be evaluated for network communications based on the one or more values, and said simplifying comprises eliminating at least one of any redundant conditions and values from the policy rule based at least in part on condition-type information of the one or more conditions;
based on said simplified policy rules, creating an access control list adapted to configure a network device, including creating at least one array of included conditions and at least one array of excluded conditions from the policy rules; and
using the access control list to generate access filters that configure the network device to control network communications in the network device, including generating, after redundancy checks, one or more deny filters by combining the at least one array of excluded conditions and the at least one array of included conditions, and wherein generating the access filters comprises adding one or more filters adapted to control access of a device to a component other than the network device in a network connected to the network device.

7. The system of claim 6 wherein the second device further comprises a permit filter.

8. The system of claim 7 further comprising a plurality of data-storage devices adapted to permit access to the second device.

9. The system of claim 6 wherein the second device further comprises a deny filter.

10. The system of claim 9 further comprising a plurality of data-storage devices adapted to deny access to the second device.

11. An article comprising a computer-readable medium which stores computer executable instructions for managing policy rules on a network, the instructions causing a computing machine to perform operations comprising:
simplifying policy rules to form simplified policy rules, wherein a policy rule comprises one or more conditions and one or more values associated with the one or more conditions, the one or more conditions to be evaluated for network communications based on the one or more values, and said simplifying comprises eliminating at least one of any redundant conditions and values from the policy rule based at least in part on condition-type information of the one or more conditions;
based on said simplified policy rules, creating an access control list adapted to configure a network device, including creating at least one array of included conditions and at least one array of excluded conditions from the policy rules; and
using the access control list to generate access filters that configure the network device to control network communications in the network device, including generating, after redundancy checks, one or more deny filters by combining the at least one array of excluded conditions and the at least one array of included conditions, and wherein generating the access filters comprises adding one or more filters adapted to control access of a device to a component other than the network device in a network connected to the network device.

12. The article of claim 11 wherein the operations further comprise expanding the policy rules into value groups, wherein value groups represent conditions occurring in the network device associated with the policy rules.

13. The article of claim 12 wherein the simplifying further includes excluding conditions that would otherwise be implied by the policy rules.

14. The article of claim 13 wherein the simplifying further includes resolving inconsistent conditions that result from expanding the policy rules and excluding the policy rule conditions.

15. A network device, comprising:
a configurable management process located on the network device having instructions to effect operations comprising:
receiving policy rules in the network device;
translating the policy rules into simplified rules, wherein a policy rule comprises one or more conditions and one or more values associated with the one or more conditions, the one or more conditions to be evaluated for network communications based on the one or more values, and said translating comprises eliminating at least one of any redundant conditions and values from the policy rule based at least in part on condition-type information of the one or more conditions;
creating an access control list adapted to configure the network device from the simplified rules, including creating at least one array of included conditions and at least one array of excluded conditions from the policy rules; and
using the access control list to generate access filters that configure the network device to control network communications in the network device, including generating, after redundancy checks, one or more deny filters by combining the at least one array of excluded conditions and the at least one array of included conditions, and wherein generating the access-filters further comprises adding one or more filters adapted to control access of a device to a component other than the network device in a network connected to the network device.

16. The device of claim 15 further comprising a connection to an external network.

17. The device of claim 16 wherein the external network is a local area network.

18. The device of claim 16 wherein the external network is the Internet.

* * * * *